G. P. Gordon,
Printing Press
No. 1,022. Reissued July 31. 1860.
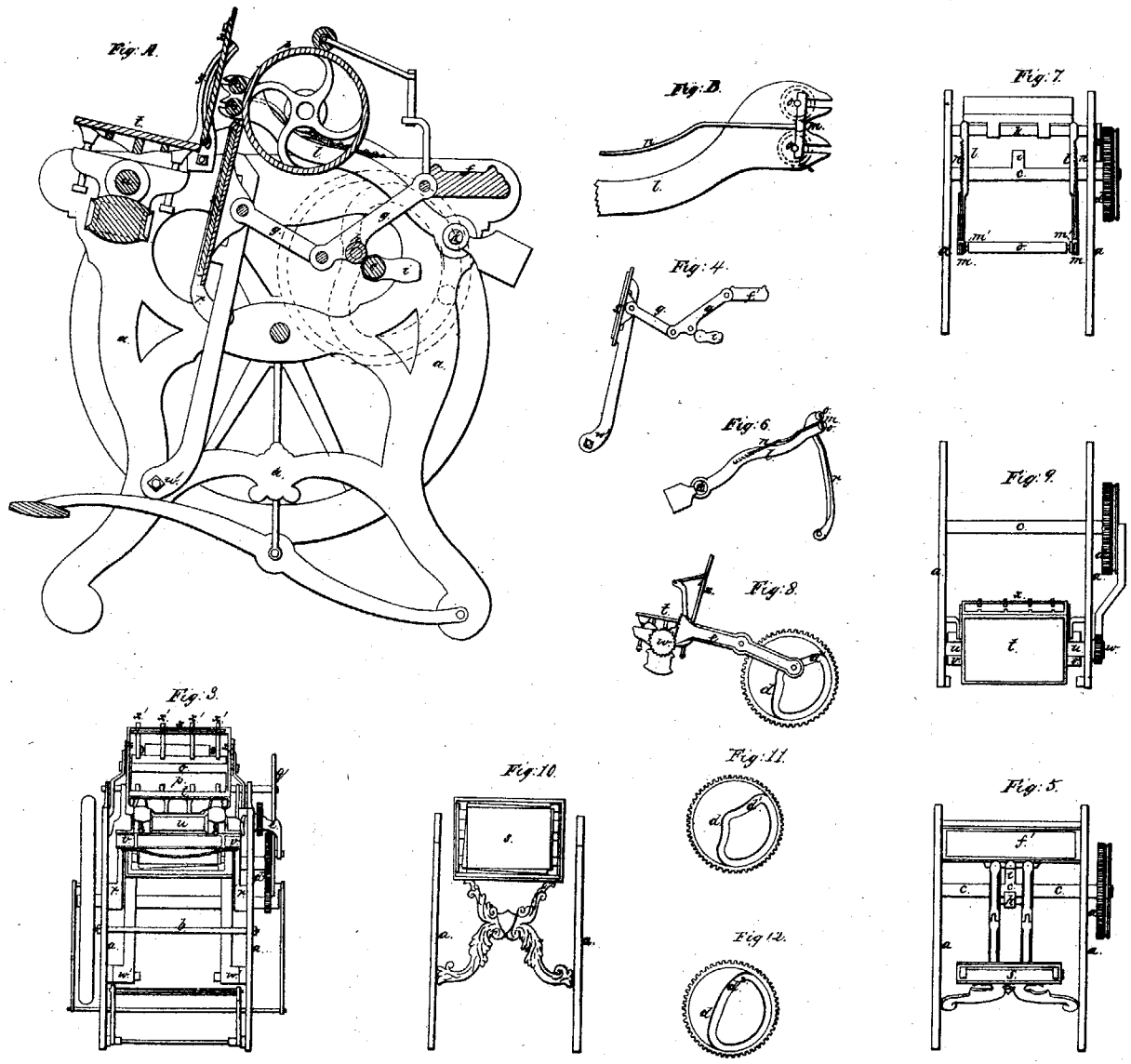
Witnesses:
J. B. Crosman
John Frank
Inventor:
Geo. P. Gordon
N. PETERS, PHOTO-LITHOGRAPHER, WASHINGTON, D. C.

UNITED STATES PATENT OFFICE.

GEORGE P. GORDON, OF NEW YORK, N. Y.

IMPROVEMENT IN PRINTING-PRESSES.

Specification forming part of Letters Patent No. 8,285, dated August 5, 1851; Reissue No. 663, dated April 8, 1856; Reissue No. 1,022, dated July 31, 1860.

DIVISION B.

*To all whom it may concern:*

Be it known that I, GEORGE P. GORDON, of New York, in the county and State of New York, have invented certain new and useful Improvements in Printing-Presses; and I do hereby declare the following to be a full, clear, and exact description thereof, reference being had to the annexed drawings and the letters of reference marked thereon, making a part of this specification, the same letters always denoting the same parts in all the drawings.

I have here shown all the drawings of my original patent of August 5, 1851, and reissued April 8, 1856, in order that the separate parts may be fully distinguished in the form I have divided them.

Of the drawings, Figure A is a side elevation in section of the whole machine, cut through its center. Fig. B indicates the method of holding the inking-rollers in their arms. Fig. 3 is a front view from the end, showing the disposition of parts of my improved machine. Figs. 6 and 8 are separate parts of the machine. Figs. 5, 7, and 9 are top views of parts of the press as placed in the frame. Fig. 10 is a front view of the bed and its supporting standard or arms upon which said bed vibrates. Figs. 11 and 12 are views of the cams on the sides of gear-wheel *d*.

The nature of my invention consists, first, in a rocking platen supported and moved upon a center or centers, the face of which rocking platen shall not be turned down, as in the press of William Church, to a horizontal position for the reception of the impression, but the face of which rocking platen shall stand out of such horizontal position, or at an angle from such horizontal position, (preferring a vertical or a nearly vertical position,) for the purpose of receiving the impression; second, in rocking such platen from the point where it receives the impression until said platen shall be brought with its face upward into a horizontal or nearly a horizontal position, for the purpose of receiving the sheet to be printed; third, in placing the face of a rocking platen, for the purpose of receiving the impression, so that said platen shall pass over or through but a little space, or travel over or through but a little distance, as it rocks or turns into the position desired for the purpose of receiving the sheet to be printed; fourth, in producing printed impressions with rapidity while I rock or turn my platen slowly because I move the platen but a short distance for each impression; fifth, in retaining a good position for the type when being inked and when giving the impression, and at the same time giving to the rocking platen the best position for it to receive the sheet to be printed; sixth, in enabling the person feeding the sheets upon a rocking platen to stand directly in front of such platen and in front of the press for such purpose; seventh, in holding the sheet of paper to be printed upon a rocking platen so that said sheet may be carried to the impression, receive a printed impression, and be drawn off from the type, and be brought back to the position where such sheet of paper was laid upon said rocking platen; eighth, in giving to a rocking platen, when receiving the sheet to be printed or when receiving the impression, a period of rest during the continued motion of other parts of the press.

To enable others skilled in the art to make and use my invention, I will describe its construction and operation.

I provide a frame, *a*, upon which the several parts operate. The main shaft *c* gets motion from pulleys or other contrivance, and conveys motion to all the movable parts of the machine. The bed *s* is a plate properly braced and so constructed that it may be moved upon standards or arms *w'* from the place of receiving the inking-rollers to the place of impression. This may be effected by toggles *g g* at its back, which will cause it to advance to the impression, yet admit its own gravity to aid in its receding motion. The platen *t* is supported and moved upon a center or centers, *u*, in such a manner that it may rock or turn with a backward and forward movement to and from the place of receiving the sheet and that of receiving the impression. The shaft *u* outside of the frame has upon it a gear-wheel, *w*, operated by the segment-gear on arm *e*, moved by the cam *d'* on the gear-wheel *d*, (See Figs. 8 and 9.) This is one method of construction, but many mechanical contrivances may be made to perform a like duty. Between the movable bed and rocking platen is a movable or adjustable sheet-holder or frisket, $x$, having grippers or nippers $x'$, attached to it. The frisket $x$ is a thin frame, and may be a simple arm or gripper, if desired. The frisket is hinged to the platen, or may be attached to some other part of the machine, and is provided with slots, through which the bolts pass to hold the adjustable grippers $x'$, and allow said grippers to be adjusted in any direction, so as to hold the sheet after it is placed upon the platen until it is relieved from the type. Two studs, one on each side of the frisket, project from the sides of said frisket, and said studs work in the cams $y$, Fig. A, for the purpose of giving the proper motions to the frisket and the grippers $x'$. The cams $y$, one of which is shown in Fig. A, are secured to the frame $a$, on each side of the platen, and are so made as to give, as the platen rocks or turns, the proper movements to the frisket $x$ and grippers $x'$. The inking-roller arms or frame $l$ are set in motion by the crank $z$, Fig. 7, through the cam $d^2$ on the gear-wheel $d$ on shaft $c$.

Operation: We will suppose the platen $t$ to be in a horizontal positon, or nearly a horizontal position, for the purpose of receiving the sheet to be printed, as shown in Fig. A, and that the sheet has been laid upon said platen. Motion being given to the main shaft $c$, the cam $d'$ on gear-wheel $d$, through the segment gear on arm $e$, and the gear-wheel $w$, begins to turn or rock the platen forward for the purpose of bringing the platen, with the sheet, to the point for it to receive the impression. As the platen rocks forward, which it will continue to do as the gear-wheel $d$ revolves, the frisket grippers $x'$, governed by the movements of the platen and the cams $y$, close or shut upon the tympan, supported by the platen, for the purpose of gripping the sheet firmly in its place. When the platen arrives at a vertical or nearly a vertical position, which it will do by the continued revolution of the gear-wheel $d$, for the purpose of receiving the impression, the impression is given, the frisket-grippers holding the sheet until said sheet is presented to and relieved from the type. Upon the further revolution of the gear-wheel $d$, the platen recedes from the impression and rocks or turns backward and upward, unclosing the frisket-grippers and relieving the sheet. The backward and upward movement of the platen is continued until the platen has assumed its first or original position, (shown in Fig. A,) where the platen remains at rest for a short time, for the purpose of allowing the printed sheet to be removed and a succeeding sheet to be laid. The printed sheet may now be removed from the platen, and the operation repeated.

The principal purpose and object of my invention is to produce printed impressions with great rapidity, and at the same time to obtain a convenient and easy method of feeding the sheets and presenting them to the impression, relieving said sheets from the type and bringing them into such a position that they may readily be removed from the press. It is highly important that the parts of the press required to effect such results should travel over or through as little space or distance as possible, for the purpose of saving the wear and friction of such parts, and for the further purpose of giving to such parts a smooth and steady movement, even though the impressions may be rapidly produced. Therefore I use a rocking platen, supported and moved upon a center or centers, the face of which platen shall be out of a horizontal position, and in a vertical or nearly a vertical position for the reception of the impression; and I rock said platen from this position until the face of said platen shall be brought into a horizontal or nearly a horizontal position for the reception of the sheet to be printed. It will be seen at once that my platen is thus required to move over or through but a little space as it rocks from one of these positions to the other. Now, the less distance the platen passes over in thus rocking or turning the slower said platen will necessarily move in a given time for each and every impression, and thus I am enabled to produce, without giving great rapidity of motion to my platen, a greater number of printed impressions in a given time. In accomplishing this I still retain a good position at all times for the type, and at the same time I enable the person operating the press to stand directly in front of it and the platen to feed and drive the press, which has never before been accomplished by any press having a rocking platen.

I will further remark, for the purpose of elucidating more clearly the advantages of my improvements, that were the face of my rocking platen turned down to a horizontal position for the reception of the impression, as in the press of Wm. Church, then, in order to bring the face of the platen upward into a horizontal position for the delivery of one sheet and the reception of another, said rocking platen would pass over or through one-half of an entire revolution. Now, for the purpose of shortening or lengthening this distance and causing the platen as it rocks or turns to pass over or through less space, and yet still to bring the platen into a horizontal or nearly a horizontal position, with its face upward, for the purpose of receiving the sheet to be printed, and for the purpose of retaining a good position for the type, and for the purpose of enabling the pressman to stand directly in front of the press and the platen, all of which the press of Wm. Church does not accomplish, I bring the face of the rocking platen, at the time of its receiving the impression, out of a horizontal position and into a vertical or nearly a vertical position—not meaning, however, to confine myself to a vertical position—and I rock my platen from the point of impression upward to ahorizontal position, not confining myself to a horizontal position so long as I obtain the advantages and purposes I have herein set forth.

In order that the pressman may be better enabled to feed the sheets with precision, and thus to insure the register with greater certainty, I give a period of rest to a rocking platen during the continued motions of other parts of the press, which has never before been done by any press having a rocking platen. All printers know the importance of perfect register. A press not registering properly is almost worthless; hence the value of giving this period of rest, and in accomplishing this without interrupting the other operations of the press.

It is further useful to my invention that some suitable means should be provided to hold the sheet upon the platen and to relieve said sheet from the type. For this purpose I use frisket grippers or nippers, to grip the sheet directly upon the tympan, supported by the platen.

I do not confine myself to the mode herein shown of constructing or operating the nippers, as many other ways may be devised for producing the desired results.

The advantages of my invention may be stated, in brief, as follows: first, I obtain for the rocking platen the best position for the reception of the sheet to be printed; second, I hold the sheet securely upon a rocking platen until said sheet is properly presented to and relieved from the type; third, I retain a good position for the type at all times; fourth, I insure a slow movement to the platen, while producing rapid work, by causing said platen to rock over or through the least possible space or distance for the purposes required; fifth, I enable the pressman to stand directly in front of the platen and the press to feed and drive the press; sixth, I give to a rocking platen, when receiving the sheet to be printed or when receiving the impression, a period of rest during the continued motion of other parts of the press.

Having thus fully described my invention, what I claim as new, and desire to secure by Letters Patent, is—

1. Supporting upon a center or centers a platen which shall rock or turn between the point necessary for the reception of the impression and the point necessary for the reception of the sheet to be printed, when the face of such rocking platen shall stand out of a horizontal position, or at an angle from a horizontal position, at the time the impression is given, substantially as herein set forth, and for the purposes described, whether the same be accomplished in the precise manner specified or in some equivalent way.

2. The frisket-grippers or their equivalents for relieving the sheet from the type, in combination with a rocking platen.

3. Giving to a rocking platen, when receiving the sheet to be printed or when receiving the impression, a period of rest during the continued motion of other parts of the press.

GEO. P. GORDON.

Witnesses:
J. C. CROSMAN,
GEO. W. HUNT.